No. 617,610. Patented Jan. 10, 1899.
G. STOFF.
MACHINE FOR SHAPING PLASTIC MATERIAL.
(Application filed July 25, 1898.)
(No Model.)

Witnesses:
Inventor:
G. Stoff.
By his Attorneys.

UNITED STATES PATENT OFFICE.

GUSTAV STOFF, OF BERLIN, GERMANY.

MACHINE FOR SHAPING PLASTIC MATERIAL.

SPECIFICATION forming part of Letters Patent No. 617,610, dated January 10, 1899.

Application filed July 25, 1898. Serial No. 686,864. (No model.)

*To all whom it may concern:*

Be it known that I, GUSTAV STOFF, a subject of the German Emperor, residing at Berlin, in the Empire of Germany, have invented certain new and useful Improvements in Machines for Shaping Plastic Material, of which the following is a specification.

My invention relates to a machine for automatically rolling, forming, and cutting from elongate masses or rods of plastic material (such as marchpane, chocolate, caramel, clay, medicines, and so on) round-shaped pieces, the rods being placed above a pair of horizontal rotating rollers, each having several annular furrows or channels divided by sharp edges; and the objects of my invention are, first, to enable the rollers to engage the rod placed above them and to roll it; second, to enable the rollers to change the rod by squeezing and forming while rolling into round-shaped pieces; third, to enable the rollers to cut the rod entirely through and to divide it into separate pieces that require no further extra work, and, fourth, to adjust the machine for various thicknesses of the rods to be cut. I attain these objects by a mechanism illustrated by the drawings accompanying this specification.

Figure 1:
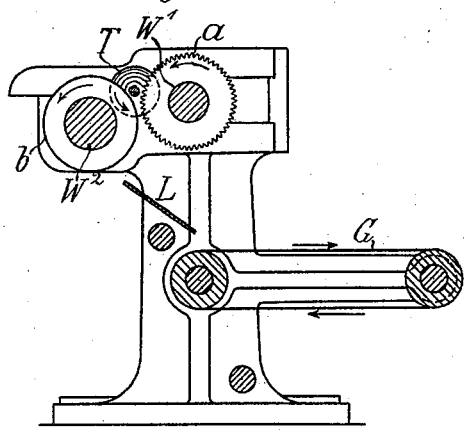
Figure 2:
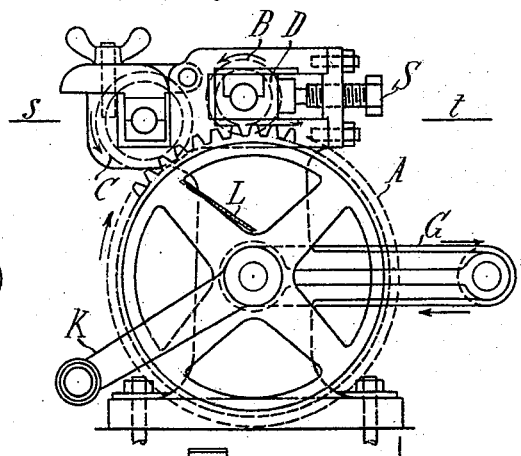
Figure 3:
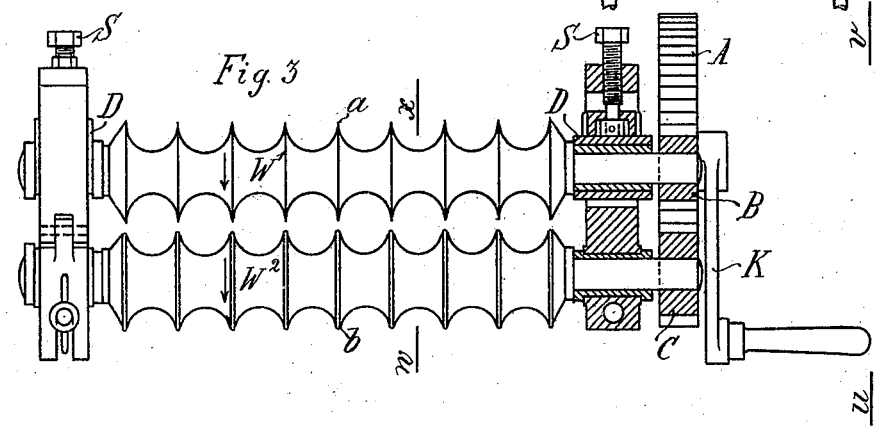

In the drawings, Figure 1 is a vertical sectional view of the machine, taken in the line $w\,x$ in Fig. 3. Fig. 2 is a side view of the machine, taken from the line $u\,v$ in Fig. 3; and Fig. 3 is for the left-hand part a ground plan and for the right-hand part a horizontal sectional view of the machine, taken on the line $s\,t$ in Fig. 2, the delivery-table being omitted for the sake of clearness.

Similar letters refer to similar parts throughout the several views.

By means of the crank K and the spur-gear A and two pinions B and C the two rollers W' and W² are rotated in the same direction. As the pinion B has less teeth than the pinion C, they having, for example, fifteen and twenty teeth, respectively, it follows that the roller W' is given a greater speed than the other roller W². The roller W' has sharp-toothed cutting edges $a\,a$, as shown in Fig. 1, while the roller W² has smooth cutting edges $b\,b$. When the elongate mass or rod T of plastic material (shown in Fig. 1) is placed above the two rollers W' and W², it will commence to revolve in the opposite direction, as indicated by the arrow. The plastic material T will be engaged by the teeth of the roller W' and will be drawn in between the two rollers, while being squeezed and formed into pieces of a shape corresponding with the furrows of the two rollers.

The furrows of the roller W' are deeper than those of the other roller W², so that the cutting edges $a\,a$ of the former reach beyond the center of the squeezed and formed mass or rod T. The consequence of this is that the plastic material will be entirely cut through and divided into separate round-shaped pieces. To adjust the machine for cutting plastic masses or rods of various thicknesses, the roller W' is hung in movable bearings D D, that may be shifted by the screws S S. The furrows of the roller W' may be made so deep that within certain limits the roller W' may be shifted sidewise without the cutting edges $a\,a$ getting out of the center line of the rod T, so that the latter may be cut through and divided into separate pieces in any case. The pieces cut will fall down the chute L on the delivery-table G to be led off and collected.

The shapes of the furrows of the two rollers W' and W² may be varied according to the sizes and shapes required of the pieces—*i. e.*, balls, eggs, cones, gooseberries, cherries, and so on.

Having fully described my invention, I declare that what I claim, and desire to secure by Letters Patent, is—

1. In a machine for rolling, forming and cutting plastic masses or rods into round-shaped pieces, the combination with an annularly-furrowed roller hung in fast bearings and having blunt edges, of a second annularly-furrowed roller hung in movable and adjustable bearings and having sharp-toothed cutting edges, the furrows of said second roller having the same shape but a greater depth than the corresponding furrows of said first roller, a large pinion secured to one end of said first furrowed roller, a small pinion secured to one end of said second furrowed roller, a spur-gear engaging said pinions and thereby driving said rollers in same direction, but at different speeds, and means for driving said spur-gear, substantially as set forth.

2. In a machine for rolling, forming and cutting plastic masses or rods into round-shaped pieces, the combination with a furrowed roller hung in fast bearings and having several annular furrows and blunt edges, of a second furrowed roller hung in movable and adjustable bearings and having several annular furrows and sharp-toothed cutting edges, the furrows of said second roller having the same shape but a greater depth than the corresponding furrows of said first roller, a large pinion secured to one end of said first furrowed roller, a small pinion secured to one end of said second furrowed roller, a spur-gear engaging said pinions and thereby driving said two furrowed rollers in same direction, but at different speeds, and a crank attached to said spur-gear for driving same, substantially as set forth.

3. The combination with a frame, of two coacting rollers mounted therein, one of said rollers having smooth annular cutting edges, and the other of said rollers having annular cutting edges with teeth thereon.

4. In an apparatus for working plastic material, the combination of two rollers, each of which is provided with annular grooves matching with each other in the said rollers, the grooves forming annular ridges on the rollers, the ridges of one roller being blunt and the ridges of the other roller being sharp, to form cutting edges, the grooves of the roller with the cutting edges being deeper than the grooves of the other roller.

5. In an apparatus for working plastic material, the combination of two grooved rollers, one of said rollers having cutting edges formed between the grooves, and the grooves of the said roller being deeper than the grooves of the other roller.

In witness whereof I have hereunto signed my name, this 9th day of July, 1898, in the presence of two subscribing witnesses.

GUSTAV STOFF.

Witnesses:
　W. HAUPT,
　C. H. DAY.